Figure 1:
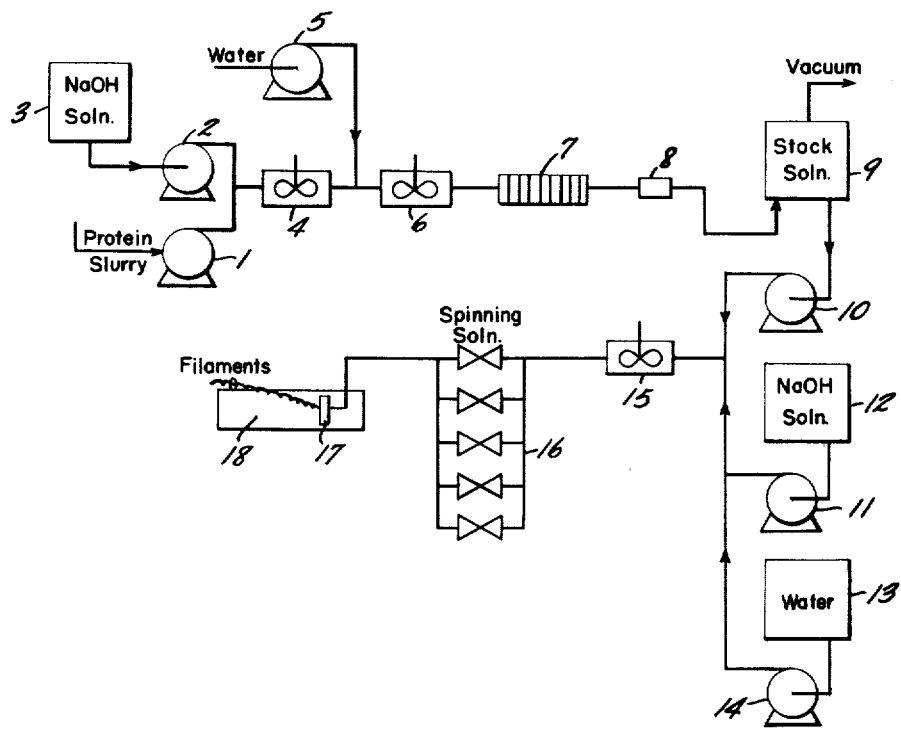

United States Patent Office 2,809,090
Patented Oct. 8, 1957

2,809,090

EXTRUDING PROTEIN SOLUTIONS

Edward East, Harrold, and Edward Green, St. Albans, England, assignors to Lever Brothers Company, New York, N. Y., a corporation of Maine Application August 11, 1954, Serial No. 449,248

Claims priority, application Great Britain August 18, 1953

3 Claims. (Cl. 18—54)

This invention relates to the extrusion of protein solutions into a coagulating bath to form products such as, for instance, filaments.

Protein solutions adapted to be so extruded, hereinafter termed "spinning solutions," prepared from globular proteins, should contain the protein in a modified form and should, preferably, have a viscosity of at least 25 poises, the optimum viscosity depending on the product to be formed and on the equipment available. (The viscosity referred to in this specification is apparent viscosity as determined at known rates of shear by a rotary type of viscometer.)

The preparation of a spinning solution from a globular protein involves, as a preliminary step, the substantial separation of the protein from other substances associated with it in the natural product in which it occurs. A substantially oil-free groundnut meal, obtained by low temperature solvent extraction, might, for instance, be suspended in water and sufficient alkali added to dissolve the protein whilst leaving undissolved carbohydrates and certain other materials contained in the meal. After separation of the extract, the protein may be precipitated from it, for example, by the addition of acid, and may then be collected by filtration or centrifugation.

Spinning solutions have been prepared by dissolving the separated protein in aqueous alkali and then maturing the solution at a highly alkaline pH for a prolonged period, which may extend to a day or more.

An outstanding disadvantage of this process is the critical nature of the conditions under which the solution has to be matured if the matured solution is to have a suitable and reasonably stable viscosity whilst it is being extruded. In particular, the permissible limits of protein concentration and alkalinity (expressed as initial pH since the pH tends to fall somewhat during maturing) are undesirably narrow. In spite of these precautions, the viscosity of the matured solution is apt to change considerably during the time required to extrude the whole batch of solution.

It has now been found that, within fairly wide limits of protein concentration and alkalinity, prolonged maturing of the solution is not necessary and that spinning solutions can be obtained within a short time of preparing a solution of sufficient alkalinity to produce a marked increase in viscosity after the initial mixing period. Solutions of such alkalinity are hereinafter termed "ageing solutions." As a result of this discovery, it has been possible to devise a continuous process of preparing and extruding spinning solutions and, thus, to overcome the above-described difficulty of the previous process, the change of viscosity of the spinning solution during extrusion.

According to the invention there is provided a process of extruding a spinning solution, prepared from a globular protein, into a coagulating bath which process comprises continuously feeding an amount of an alkaline substance sufficient to produce an ageing solution into a stream of an aqueous solution or suspension of the protein and continuously passing the resultant stream of ageing solution to the extrusion device.

The process makes it possible to extrude all the spinning solution at the same stage of ageing, so that products of substantial uniformity of properties may be obtained. Moreover, there are reasons for believing that a condition, defined later on as "peak viscosity," through which many ageing solutions pass, represents an optimum for extruding, particularly as regards the strength of the products, and the present process provides a means of extruding all the spinning solution in that condition. The present process is more flexible than the previous process, in that the various factors affecting viscosity are more easily controlled and in that the permissible limits of protein concentration and alkalinity which have to be observed when preparing the ageing solution are wider. Further, little waste need be involved before a mistake can be corrected, whilst in the previous process a whole batch of solution may have to be discarded if a mistake occurs in its preparation. When products, such as filaments, are to be used in food products a prolonged period of maturing the ageing solution at high alkalinity is undesirable and it is, therefore, an additional advantage of the present process that the solution is being aged for a short period only.

The oilseed proteins are the proteins most commonly used in the process of the invention and amongst these soya bean and groundnut protein are of particular importance.

In the drawing,

Fig. 1 is a schematic flow sheet of the process of the invention.

As a first step in the present process, it has been found convenient to prepare a stock solution from the separated protein at a pH at which no appreciable increase in viscosity occurs. With groundnut or soya bean protein, for example, at room temperature, little or no increase in viscosity occurs in solutions having a pH at or below 10.5 and the pH of stock solutions prepared from these proteins normally lies between 10.0 and 10.5. The stock solution may be prepared batchwise or continuously. The separated protein, which may have been dried for storage purposes, is, as a rule, first thoroughly mixed with water to give a slurry fed by pump 1 and sufficient alkali, usually sodium hydroxide 3 fed by pump 2, by mixing devices 4 and 6 is then added to give a stock solution of the required pH. Thorough mixing at this stage, preferably under reduced pressure, is very advisable. The solution may be diluted, if desired, with water fed by pump 5. The solution obtained is then normally filtered by filter 7. It is usual to check the solids content of the resultant solution by refractive index measurement device 8. Provided the percentage content of impurities in the separated protein and the amount of alkali added to the slurry are known, the measurement allows the actual protein content of the stock solution 9 to be calculated. In practice, a given protein concentration in the stock solution is usually aimed at and any final adjustments, such as the addition of water to the solution, may conveniently be carried out at this stage. The choice of concentration may vary with the particular globular protein from which the stock solution is derived. For example, the protein content of a groundnut protein stock solution is generally adjusted to the range from about 20 to about 30%, preferably about 25%, whilst that of a soya bean protein stock solution normally lies in the range of about 10 to about 15%.

A continuous stream of such a solution 9 or of a suspension is fed by pump 10 to the extrusion device containing a spinneret 17 immersed in an acid coagulating bath 18, alkali 12, fed by pump 11, and water 13, if desired, fed by pump 14 being introduced continuously into the stream and mixed therewith by mixing device 15 in the appropriate proportions to produce an ageing solution of the required initial pH and protein concentration.

The time taken by the solution to reach the device will depend on the length of the path it is made to traverse and its rate of flow through valve system 16. The alkali is introduced into the stream at a point which, according to the rate of flow, will give the required ageing time before the solution is extruded. Apart from considerations of plant economy, ageing times in excess of about one hour are not likely to lead to satisfactory working of the process, and it is preferred not to age for more than half an hour. A number of advantages result from keeping the ageing time as short as possible, and spinning solutions have been obtained after as little as 1½ minutes' ageing. It has been found that an ageing time of 10 minutes need not be exceeded in most cases.

Provision should be made to ensure thorough mixing of the alkali with the stream of protein solution or suspension, preferably immediately upon the introduction of the alkali. Sodium hydroxide is the alkali most frequently used but any alkaline substance compatible with the use to which the solution and extruded products are to be put and capable of raising the pH of the solution to the required extent may be used. Conveniently, the alkali is introduced as an aqueous solution, preferably of a concentration not exceeding about 20%. Dilute solutions can be more easily metered. The alkali may be injected into the stream by a proportioning pump.

The viscosity behaviour of the solutions, during ageing, varies with the pH, the protein concentration, the particular protein used, and the temperature of ageing. Once the effect of these various factors is understood, simple tests will show what ageing conditions, including time of ageing, may be used in any particular case. Some or all of the various factors are interdependent. They will now be discussed in more detail.

EFFECT OF pH

After the initial mixing period, the viscosity of an ageing solution rises, usually rapidly. This rise is followed, except in the lower ranges of pH, such as 11.5 or less with groundnut protein, by a fall. The maximum value attained during this rise and fall is hereinafter termed "peak viscosity." The fall in viscosity following peak viscosity may be considerable. It may be followed, often after one or more hours, by a gradual rise in viscosity. In the case of groundnut protein at room temperature, for example, such a rise has been observed at or below a pH of about 12.5 but not at higher alkalinity. Eventually, the viscosity may become comparatively stable.

It has been established that groundnut protein ageing solutions having an initial pH ranging from about 11.5 to 13.5 are satisfactory in the present process, the suitability of any particular pH value within this range depending, of course, on the other ageing conditions. At temperatures higher than room temperature or when using a protein which has been modified during previous treatment, somewhat lower values may be permissible.

When working with a given batch of protein it is often convenient to express alkalinity in terms of the ratio of amount of alkali to amount of protein present in the solution, rather than in terms of pH. Furthermore, increases of the alkali/protein ratio beyond a certain value, often in the neighbourhood of 0.1, may not be reflected in appreciably greater pH values. On the other hand, the alkali/protein ratio needed to give a certain pH with different batches, even of the same protein, may vary to some extent. Values of alkali/protein ratios given in this specification are based on sodium hydroxide.

It is generally preferred to choose ageing conditions which give rise to a peak viscosity. Under these conditions the solution, once past peak viscosity, may fairly rapidly become difficult or impossible to extrude. It is preferred to extrude the solution at or near peak viscosity, particularly as there are indications that peak viscosity represents the optimum state for extrusion of any given solution as regards strength of the extruded product. A spinning solution is, however, usually obtained before peak viscosity is reached. Under ageing conditions which give rise to a peak viscosity, the solution is normally extruded whilst in the range between ⅓ peak viscosity and peak viscosity. Particularly when the extruded products are to be used for edible purposes, it is thought advisable not to allow the solution to drop below ⅓ of peak viscosity before extruding.

At a given concentration of groundnut protein and under otherwise comparable conditions, the value of peak viscosity increases with increasing initial pH up to a value of about 12.5 (a value usually corresponding to an alkali/protein ratio of about 0.06). The peak viscosity decreases as the initial pH is increased from about 12.5 to about 13.1 (ratio of about 0.12). At higher alkali/protein ratios the peak viscosity rises again with an increases in the alkali/protein ratio.

The time taken to reach peak viscosity decreases with increasing alkali/protein ratio up to a ratio of about 0.12 (pH of about 13.1) and then remains substantially unaffected by further increases in the ratio.

By way of example, the following peak viscosities were obtained in the times stated with a groundnut protein ageing solution containing 19.6% protein, expressed on the weight of protein+water present.

| NaOH/protein ratio | Equivalent pH | Peak viscosity at 25° C., Poises | Time to reach peak viscosity, Seconds |
|---|---|---|---|
| .063 | 12.5 | 119 | 420 |
| .073 | 12.7 | 143 | 225 |
| .081 | 12.8 | 92 | 110 |
| .106 | 13.1 | 64 | 95 |
| .147 | 13.1 | 67 | 75 |
| .186 | 13.1 | 82 | 70 |
| .250 | 13.1 | 142 | 75 |

All these solutions could be extruded at peak viscosity to form filaments.

EFFECT OF PROTEIN CONCENTRATION

It has been established that groundnut protein solutions containing from about 15–27% protein, expressed on the weight of protein+water present, are satisfactory for the process of the invention. The suitability of any particular concentration within this range depends, of course, on the other ageing conditions, in particular the alkalinity.

An increase of concentration has the effect of increasing the magnitude of any peak viscosity which may be obtained. By way of example, the following results were obtained with an ageing solution derived from groundnut protein, the protein content being expressed on the weight of protein+water present.

| Percent Protein | NaOH/protein ratio | Peak viscosity at 25° C., Poises | Time to reach peak viscosity, Seconds |
|---|---|---|---|
| 18.1 | 0.12 | 24 | 80 |
| 18.8 | 0.12 | 40 | 85 |
| 19.8 | 0.12 | 87 | 85 |
| 20.5 | 0.12 | 190 | 85 |
| 21.5 | 0.12 | 338 | 90 |

All these solutions could be extruded at peak viscosity to form filaments.

In the case of groundnut protein solutions, a concentration of 18% or more, preferably between 20 and 23% approximately, is normally used in conjunction with an initial pH of about 12.3 to 13.1 (usually alkali/protein ratio of about 0.05 to 0.15), a pH in the neighbourhood of 12.5 being preferred.

The protein concentration of the ageing solution is most conveniently controlled by adjusting the concentration of the stock solution so that the appropriate concentration will be obtained on subsequent dilution with aqueous alkali according to the invention.

EFFECT OF PARTICULAR PROTEIN USED

The detailed behaviour during ageing of different globular proteins may vary quite considerably, and different batches of the same type of protein, for example, groundnut protein, may also show variation due to intrinsic differences between the protein of different batches or differences in the manner in which the protein has been extracted, stored or otherwise treated before ageing. Tests to find the optimum conditions for a given purpose should, therefore, be made before any particular protein is used.

EFFECT OF TEMPERATURE

Quite generally, viscosity readings obtained at raised temperatures are lower than the corresponding readings at a lower temperature. Increasing the temperature speeds up the rate of the ageing reaction, as is shown by a reduction of the time taken to reach peak viscosity. Provided the ageing temperature is kept below about 60° C., however, the effect of temperature is not of primary importance. It is preferred to carry out the process at 25° C. or below, conveniently at room temperature.

Ageing solutions to be extruded may contain any of the ingredients which might usually be present in spinning solutions.

The invention has been described with particular reference to the production of filaments. Such filaments may be further treated to give textile fibres. The filaments may also be used in the preparation of food products. The invention is, however, also applicable to the formation, by extrusion, of other products, for example films and tubes.

The following examples illustrate the invention further.

Example 1

Three batches of stock solutions were prepared from separated groundnut protein by first making up an aqueous slurry and then adding, with thorough mixing, the requisite amount of aqueous alkali. Air was excluded from the mixer and the tanks holding the stock solutions were maintained under reduced pressure to deaerate the solutions. The pH of the stock solutions was in the range from 10.0 to 10.5.

Each of the solutions was used to make filaments according to the following description and the data given in tabular form below.

A metered stream of aqueous alkali was fed into a metering pump together with a stream of stock solution. The mixture was passed through a mixing device and then to the spinneret through a pipe and valve system which allowed the length of the path of the ageing solution to be adjusted.

The spinneret had 5000 holes of 90 microns diameter and was immersed in a coagulating bath containing 12% NaCl and 6% acetic acid.

| Batch | 1 | 2 | 3 |
|---|---|---|---|
| NaOH solution: | | | |
| percent concentration | 5.4 | 4.1 | 9.1 |
| feed rate, grams/minute | 10.3 | 8.3 | 12.0 |
| Ageing solution: | | | |
| percent protein, calculated on weight, protein+water present | 20.6 | 21.2 | 21.0 |
| feed rate, grams/minute | 75 | 73 | 75 |
| NaOH/protein ratio | 0.066 | 0.050 | 0.100 |
| initial pH | 12.9 | 12.3 | 13.1 |
| temperature, ° C | 20 | 22 | 22 |
| peak viscosity, poises | 140 | 180 | 100 |
| viscosity at spinneret, poises | 140 | 80 | 50 |
| peak viscosity time, minutes | 6½ | 20 | 2¾ |
| actual ageing time, minutes | 6½ | 3½ | 10 |

Example 2

A stock solution having a pH of 10.15 and containing 12.5% solids was prepared from separated soya bean protein. The solution was then held under reduced pressure.

A metered stream of aqueous sodium hydroxide solution and a stream of the stock solution were fed via a metering pump to a mixing device so as to give an ageing solution containing 12.2% solids and having an initial pH of 12.63 (alkali/protein ratio 0.08). The ageing solution was then passed to a spinneret having 5,000 holes of 90 microns diameter, the ageing time being 7 minutes. The spinneret was immersed in a coagulating bath containing 6% NaCl and 6% acetic acid. The composition of the ageing solution was such as to give peak viscosity after 12 minutes' ageing.

We claim:

1. A process of preparing shaped oilseed protein products comprising preparing a solution of oilseed protein having a protein concentration of from about 10% to about 30% and a substantially constant viscosity on standing, continuously feeding sodium hydroxide into a stream of the protein solution to produce an initial pH therein in the range from about 11.5 to about 13.5, allowing the stream of protein to age for a time less than about one hour whereby the viscosity of the stream of protein will increase, and immediately thereafter extruding the resulting stream of protein spinning solution through an extrusion device immersed in an acid coagulating bath while the increased viscosity of the stream of protein spinning solution is within the range from ⅓ of its peak viscosity to its peak viscosity.

2. A process of preparing shaped groundnut protein products comprising preparing a solution of groundnut protein having a protein concentration of from about 15% to about 27% and a substantially constant viscosity on standing, continuously feeding sodium hydroxide into a stream of the protein solution to produce an initial pH therein in the range from about 11.5 to about 13.5, allowing the stream of protein to age for a time less than about a half hour whereby the viscosity of the stream of protein will increase, and immediately thereafter extruding the resulting stream of protein spinning solution through an extrusion device immersed in an acid coagulating bath while the increased viscosity of the stream of protein spinning solution is within the range from ⅓ of its peak viscosity to its peak viscosity.

3. A process of preparing shaped soya bean protein products comprising preparing a solution of soya bean protein having a protein concentration of from about 10% to about 15% and a substantially constant viscosity on standing, continuously feeding sodium hydroxide into a stream of the protein solution to produce an initial pH therein in the range from about 11.5 to about 13.5, allowing the stream of protein to age for a time less than about a half hour whereby the viscosity of the stream of protein will increase, and immediately thereafter extruding the resulting stream of protein spinning solution through an extrusion device immersed in an acid coagulating bath while the increased viscosity of the stream of protein spinning solution is within the range from ⅓ of its peak viscosity to its peak viscosity.

References Cited in the file of this patent

UNITED STATES PATENTS 2,251,704    Evans    Sept. 12, 1950
2,650,168    Dijk    Aug. 25, 1953

UNITED STATES PATENT OFFICE
CERTIFICATE OF CORRECTION

Patent No. 2,809,090                                                                   October 8, 1957

Edward East et al.

It is hereby certified that error appears in the printed specification of the above numbered patent requiring correction and that the said Letters Patent should read as corrected below.

Column 2, lines 46 and 47, after "pump 2," strike out "by mixing devices 4 and 6" and insert the same after "mixing" in line 48, same column.

Signed and sealed this 31st day of December 1957.

(SEAL)
Attest:
KARL H. AXLINE

Attesting Officer

ROBERT C. WATSON
Commissioner of Patents